March 2, 1971  W. K. GROSS  3,566,417

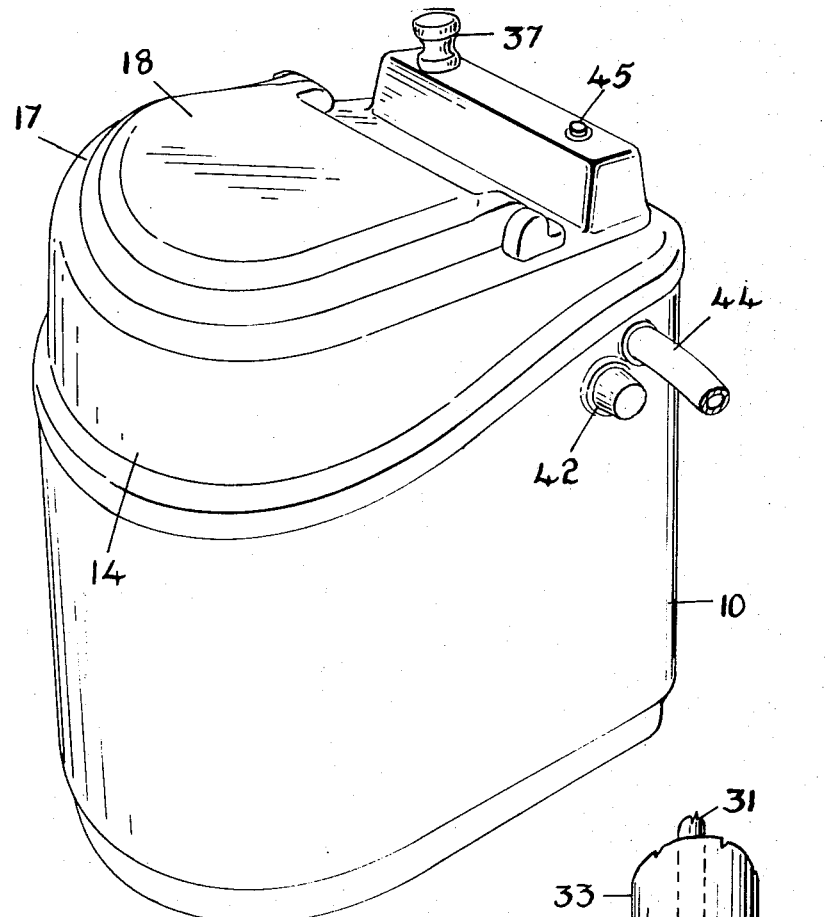
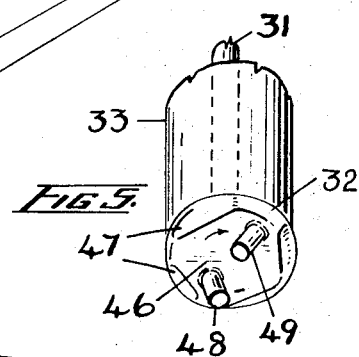
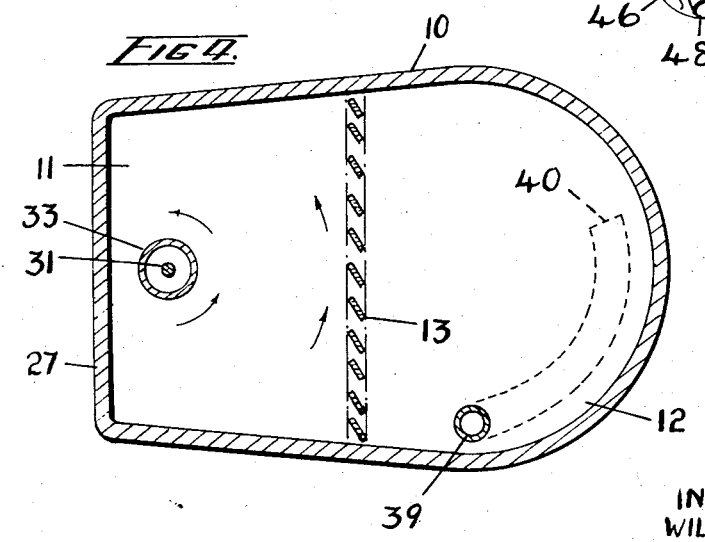

COMBINATION TOILET AND HOLDING TANK

Filed Nov. 21, 1968  2 Sheets-Sheet 2

INVENTOR
WILLIAM KEITH GROSS
BY
Maybee & Legris
ATTORNEY

United States Patent Office 3,566,417
Patented Mar. 2, 1971

3,566,417
COMBINATION TOILET AND HOLDING TANK
William K. Gross, Agincourt, Ontario, Canada, assignor to Canadian Gisholt Plastics Limited, Toronto, Ontario, Canada
Filed Nov. 21, 1968, Ser. No. 777,629
Claims priority, application Canada, Nov. 25, 1967, 6,089
Int. Cl. E03d 11/10
U.S. Cl. 4—77
7 Claims

ABSTRACT OF THE DISCLOSURE

A toilet for house trailers, boats, cottages and the like has a holding tank for container sewage of organic origin, a perforate partition dividing the holding tank into a primary chamber which contains a spinning macerator which produces a cyclo-flow of liquid therein and a secondary chamber; the baffle acting as a deflector to maintain the cyclo-flow and prevent current into the secondary chamber. The rotating plate of the macerator which creates the cyclo-flow and breaks up solids has a pair of downwardly projecting fingers that lean backward relative to the direction of spin of the rotating plate.

---

Figure 2:
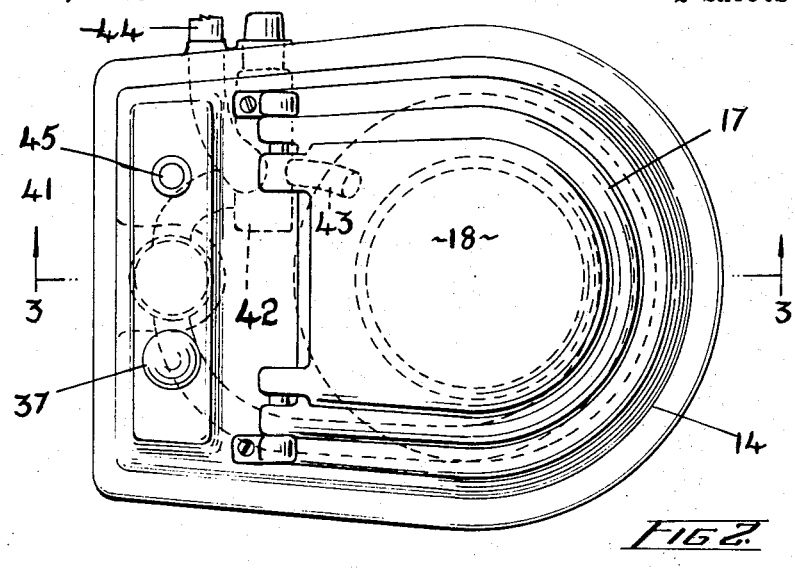

Toilet facilities for cottages, house trailers, house boats, cabin cruisers and the like present a problem in connection with the treatment and disposal of the sewage in a manner which will not create pollution of waterways. For example, a cottage may be built in a location which does not permit the installation of a septic tank with adequate drainage bed. As most cottages, particularly those used for summer vacations, are located close to a lake, river or the like, the danger of polluting the water is very great. Similarly, for example, boats which have toilet facilities have been discharging, in most cases, the sewage directly into the water. Some boats are equipped with what is known as chlorinator-macerator which treats the sewage before discharging it into the water. Such treatment has been partially successful in eliminating some of the pollution but some pollution prevention authorities consider that even the small amount of pollution created by chlorinator-macerators cannot be tolerated.

Consequently, laws are being enacted by the legislators of the various states and provinces, particularly on the North American continent, which will prohibit the discharge of toilets into the waterways and will require, for example, all boats having sleeping accommodation, to be provided with toilets having a holding tank, the holding tank to be emptied by dockside facilities.

There are presently on the market a number of toilets which incorporate a holding tank which is adequate for the average family and would not be required to be emptied, under normal usage, more often than once a week. However, one of the difficulties with the present toilets is that they become clogged and inoperative by reason of their inability to handle facial tissue which is made to have substantial strength (called wet strength).

A further difficulty with the known toilet is that they are not odour free and the odour from the toilet will escape from the room in which the toilet is located. The present invention is constructed to overcome the foregoing and other disadvantages of the prior devices.

The toilet of the present invention comprises in combination;

(a) a hollow body forming a holding tank;
(b) a closure for the holding tank which includes a seat portion and a hinged cover;
(c) a bowl located below said seat and having a discharge outlet adapted to communicate with the holding tank;
(d) a control means located between the discharge outlet and the holding tank and operable to allow liquid to pass from the discharge outlet to the holding tank, and to interrupt such passage;
(e) a flushing conduit system communicating with the holding tank and the bowl including pump means for flushing the bowl with liquid from the holding tank;
(f) a discharge conduit system for discharging the contents from the holding tank; and
(g) a macerator located in the holding tank.

Figure 3:
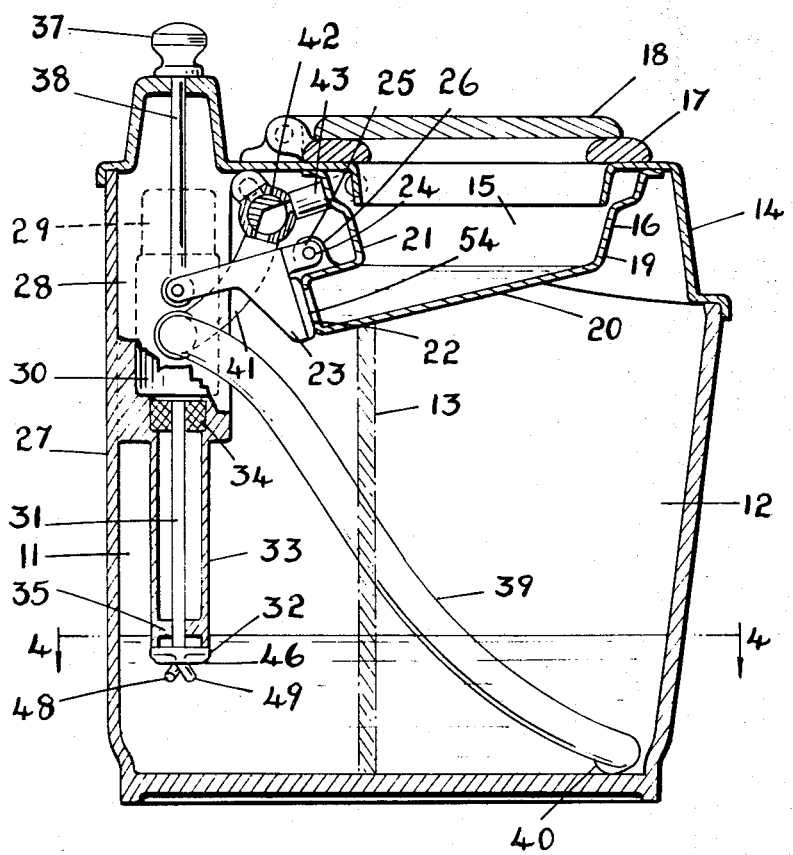

For an understanding of the construction and operation of the invention, reference is to be had to the following disclosure and the accompanying drawings which illustrate a preferred embodiment of the invention and in which:

FIG. 1 is a perspective view of a toilet constructed in accordance with the present invention;
FIG. 2 is a plan view of the toilet illustrated in FIG. 1;
FIG. 3 is a vertical cross section of the line 3—3 of FIG. 2;
FIG. 4 is a cross section on the line 4—4 of FIG. 3; and
FIG. 5 is a fragmentary view to show the construction of the macerator.

Referring now to the drawings the toilet comprises a hollow body 10 which is open at the top and is divided into a primary chamber 11 and a secondary chamber 12 by a partition 13 which will be hereinafter more particularly described.

Removably mounted on the top rim of the body 10 is a closure member generally indicated by the numeral 14 which is preferably constructed so that it can be removably mounted thereon. It will be seen from FIG. 3 that the closure member includes a large opening 15 which is defined by a downwardly projecting flange 16. Mounted on the top of the closure is the usual toilet seat 17 and the lid 18. Mounted on the underside of the closure 14 and aligned with the opening 15 is a toilet bowl 19 which has its bottom 20 sloping downwardly towards the primary chamber 11, the bottom 20 and the rear wall 21 of the bowl terminating in a discharge outlet 22. The discharge outlet 22 is closed by a valve 23 which is pivotally mounted on the bowl by means of a pivot pin 24 entered through the extension 25 of the valve 23 and the boss 26 carried on the rear wall 21.

The rear wall 27 of the body 10 is formed on the inner side thereof with a chamber 28 which houses an electric motor 29. This motor has a common shaft that drives a pump 30 and a shaft extension 31 on the lower end of which is mounted a macerator 32 which will be more particularly described later. The extension shaft 31 is mounted in a downwardly extending casing 33 which is formed, in the present case, integrally with the chamber 28 and as an extension thereof. The shaft 31 is journalled in bearings 34, 35.

The valve 23 is formed with a rearwardly extending arm 36 and is operatively connected to the manually operated handle 37 by linkage 38.

The flushing and discharge conduit system comprises a conduit 39 which has one end connected to the inlet side of the pump 30. Its opposite end, indicated by the numeral 40 which is the inlet end to the conduit system and will be hereinafter referred to as inlet 40, is positioned adjacent the bottom of the secondary chamber 12. On the discharge side of the pump 30 is a discharge conduit 41 which is provided with a two-way valve 42. As shown in FIG. 3 one side of the two-way valve communicates through a pipe 43 with the toilet bowl as shown and the other side through a pipe 44 (shown in FIG. 2) to empty the tank. The valve 42 has actuating means extending exteriorly of the body 10, as shown in FIGS. 1 and 2, so that its position may be altered manually.

To form a good seal between the opposing faces of the discharge outlet 22 and the valve 23, there is provided an O-ring 54.

The electric current to the motor 29 is controlled by means of a push button switch 45.

The macerator 32 which is shown in FIG. 3 and in greater detail in FIG. 5 comprises a disc shaped member 46 of substantially the same diameter as the casing 33 with only sufficient clearance between the member 46 and the bottom end of the casing 33 as will not interfere with the disc freely rotating. The periphery of the member 46 is formed with indentations 47 which act as an impeller to not only apply a whirlpool action to the liquid in the compartment 11 but also to macerate solid material. Projecting downwardly from the bottom face of the disc 46 is a pair of fingers 48, 49. These fingers are mounted to lean backwards from the direction of rotation. By so mounting the fingers, tissue paper such as facial tissue will be prevented from becoming entangled around the macerator.

The baffle 13 is constructed in the form of louvers which are disposed in a direction to act as deflectors to maintain the cyclo-flow of the liquid in the primary chamber 11 and inhibit current flow into the secondary chamber. The baffle serves largely to confine the macerated solids in the primary chamber. The baffle may alternatively be constructed of stretched heavy gage metal.

The use of the device is simple. The primary and secondary chamber are initially charged with a combination of chemicals which destroys bacteria and viruses; disinfects and masks odours. The initial charge fills the chambers to the line indicated by the cross section line 4—4. To flush the toilet the valve 23 is opened by lifting on the handle 37 and pushing the push button switch 45. When the valve 23 is opened the contents of the toilet bowl 15 are dropped into the primary chamber 11. The actuation of the push button switch 45 causes the electric motor 29 to operate to drive the macerator 32 and the pump 30. The macerator causes whirlpool motion in the primary chamber 11 as previously described, to macerate solids introduced therein from the toilet bowl.

The whirlpool motion has the effect of beating the solids present in the primary chamber and thus breaks them into a pulplike consistency. Further, the whirlpool motion serves to draw solids away from the louvers 13, as shown in FIG. 4. Thus, paper and the like present in the primary chamber is prevented from clogging the openings in the screen, and by repeated operation of the macerator, the paper is disintegrated to a pulplike consistency.

The apertures in the screen are of a size such that large lumps of solid material are prevented from passing into the secondary chamber 12. When the solids have been beaten to a pulplike consistency as previously described, they can pass through the screen along with the liquids, and they are also then suitable for passage with the liquids through the conduit system 40 to flush the bowl.

At the same time as the macerator is being operated, the pump 30 raises liquid from the secondary chamber 12, via conduits 39 and 41, valve 42 (which for this operation is maintained in its position shown in FIG. 3) and pipe 43, into the toilet bowl 15. As long as valve 23 is held open, the toilet bowl will be washed with liquid from secondary chamber 12. If the motor 29 is operated after valve 23 is closed, as is normal, toilet bowl 15 is refilled with liquid from secondary chamber 12.

To discharge the whole contents of the body 10, the valve 42 is moved to its position in which it connects discharge conduit 41 with pipe 44. Push button 45 is actuated to operate motor 29, so that the contents of the chambers are pumped out through pipe 41. The solids have been reduced by the whirlpool motion in the primary chamber to the pulplike state in which they can be discharged along with the liquids.

Whilst the preferred embodiment illustrated shows the use of a valve interposed between the bowl and the holding tank, it will be clear that other suitable means, such as a trap, which provides control of this communication could be used. Similarly, the provision of a combined flushing and discharge conduit system as illustrated is a preferred feature, but could be replaced with separate systems.

In a further modification according to the invention, the louvered partition 13 may be of cylindrical or frusto-conical form surrounding the macerator. The primary chamber in such case is a cylindrical or frusto-conical enclosure, and such a configuration enhances the whirlpool or vortex motion of the liquid within the primary chamber.

Additionally, the switch 45 for operating the pump and the macerator may be disposed in close proximity to, or mounted on, the valve operating handle 37, for the user's convenience. The switch 45 might even be combined with the handle 37, so that it is closed automatically when the handle 37 is operated to open the valve.

Other variations will be apparent within the scope of the invention which is defined in the appended claims.

What I claim as my invention is:

1. A toilet comprising in combination:
  (a) a hollow body forming a holding tank;
  (b) a closure for the holding tank, including a seat portion and a hinged cover;
  (c) a bowl located below the seat and having a discharge outlet adapted to communicate with the holding tank;
  (d) a control means located between the discharge outlet and the holding tank and operable to allow liquid to pass from the discharge outlet to the holding tank, and to interrupt such passage;
  (e) a flushing conduit system communicating with the holding tank and the bowl including pump means for flushing the bowl with liquid from the holding tank;
  (f) a discharge conduit system for discharging the contents from the holding tank;
  (g) a macerator located in the holding tank; and
  (h) a control valve for selectively flushing the bowl and discharging liquid from the holding tank.

2. The toilet of claim 1, wherein the control means comprises a valve and a valve actuating means operable from the exterior of the body for opening and closing the valve.

3. The toilet of claim 1 wherein the holding tank is divided into a primary chamber and a secondary chamber by a perforated screen, the discharge outlet being adapted to communicate with the primary chamber, and the macerator being located in the primary chamber.

4. The toilet of claim 3 wherein the screen comprises a baffle provided with louvers disposed in a direction to act as deflectors to maintain the cyclo-flow of liquid in the primary chamber caused by operation of the macerator and to inhibit current flow into the secondary chamber.

5. The toilet of claim 3 wherein the inlet to the flushing conduit system is located in the secondary chamber.

6. The toilet of claim 3 wherein the macerator comprises a tubular member mounted vertically in the holding tank, a motor driven shaft housed in the tubular member, and having its free end terminated adjacent the lower end of said tubular member, a rotatable member mounted on the free end of the shaft, and a pair of fingers projecting downwardly from the rotatable member and inclined backwardly with respect to the direction of rotation thereof.

7. A toilet comprising in combination:
  (a) a hollow body forming a holding tank;
  (b) a closure for said tank consisting of a seat portion and a hinged cover;
  (c) a bowl supported by said closure below said seat and having a discharge outlet communicating with the holding tank;
(d) a valve closing said outlet and valve actuating means operable from the exterior of the body for opening and closing said valve;
(e) a flushing and discharge conduit system communicating with said holding tank and said bowl, including pump means and a control valve for selectively flushing said bowl and discharging liquid from the holding tank; and
(f) an electric motor driven macerator located in said holding tank adjacent the bottom thereof.

References Cited

UNITED STATES PATENTS

| 3,094,707 | 6/1963 | Fleming | 4—115X |
| 3,329,974 | 7/1967 | Belasco et al. | 4—90X |
| 3,454,967 | 7/1969 | Corliss | 4—77 |

LAVERNE D. GEIGER, Primary Examiner

R. I. SMITH, Assistant Examiner

U.S. Cl. X.R.

4—115